(12) United States Patent
Afriat

(10) Patent No.: US 7,326,909 B2
(45) Date of Patent: Feb. 5, 2008

(54) ANGLE-ERROR CORRECTION ALGORITHM

(75) Inventor: Gil Afriat, Monument, CO (US)

(73) Assignee: EM Microelectronic-Marin SA, Marin (CH)

( * ) Notice: Subject to any disclaimer, the term of this patent is extended or adjusted under 35 U.S.C. 154(b) by 148 days.

(21) Appl. No.: 11/101,563

(22) Filed: Apr. 8, 2005

(65) Prior Publication Data

US 2006/0226345 A1    Oct. 12, 2006

(51) Int. Cl.
*G09G 5/08* (2006.01)
(52) U.S. Cl. .................. 250/221; 345/165; 345/163
(58) Field of Classification Search ............. 250/208.1, 250/208.2, 559.04, 559.29, 559.32, 559.36, 250/221; 345/157, 161, 163, 165–167
See application file for complete search history.

(56) References Cited

U.S. PATENT DOCUMENTS 5,793,357 A * 8/1998 Ivey et al. .................. 345/166
6,124,587 A * 9/2000 Bidiville et al. ............ 250/221
6,249,603 B1 * 6/2001 Rucklidge .................. 382/169
6,806,458 B2  10/2004 Rotzoll et al.

FOREIGN PATENT DOCUMENTS

WO    WO 03/049018 A1    6/2003

OTHER PUBLICATIONS

U.S. Appl. No. 11/020,108, filed Dec. 27, 2003 by inventor Gil Afriat.

* cited by examiner

*Primary Examiner*—Georgia Epps
*Assistant Examiner*—Tony Ko
(74) *Attorney, Agent, or Firm*—Sughrue Mion, Pllc.

(57) ABSTRACT

There is described a method for measuring relative motion between an illuminated portion of a surface and an optical sensing device comprising a photodetector array, which includes a plurality of rows and columns of pixels respectively aligned along first and second axes, the method allowing to determine a measurement of the relative motion between the optical sensing device and the illuminated portion of the surface based on a comparison of motion features extracted from light intensity patterns obtained with the photodetector array, wherein said method includes a checking process between two light intensity patterns for discarding erroneous motion features due to the surface design.

3 Claims, 6 Drawing Sheets

EDGE INFLECTION
MOTION ALONG AXIS X

EDGE INFLECTION
MOTION ALONG AXIS Y

ANGLE-ERROR CORRECTION ALGORITHM

FIELD OF THE INVENTION

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical sensing device including a photodetector array for measuring the varying intensity pattern of a portion of a surface which is illuminated with radiation and for extracting information about the relative motion between the photodetector array and the illuminated portion of the surface.

BACKGROUND OF THE INVENTION

Such an optical pointing device is already known in the art. International Patent Application No WO 03/049018, filed in the name of the same Assignee, which is incorporated herein by reference, discloses a method as well as a device for motion detection in an optical sensing device, such as an optical mouse.

FIG. 1 is a generalized schematic block diagram of an optical pointing device in accordance with the prior art. It comprises a photodetector array 100 including a plurality of pixels, this photodetector array 100 being coupled to processing means 110 (or motion detection processing circuit) for processing the signals outputted by the photodetector array 100.

A comparator array 120 may be interposed between processing means 110 and array 100, this comparator array 120 including a plurality of comparator circuits each for comparing the light intensity of a first pixel of array 100 with the light intensity of a second pixel of array 100 and for outputting a resulting edge direction condition.

A distinction is made between edges according to their "direction". In particular, one defines two distinct edge direction conditions: (i) a first edge condition, or positive edge, defined as a condition wherein the light intensity of a first pixel is less than the light intensity of a second pixel; and (ii) a second edge condition, or negative edge, defined as a condition wherein the light intensity of the first pixel is greater than the light intensity of the second pixel.

Taking photodetector array 100 as an example, a first axis, namely axis X, extends with a positive direction from left to right and a second axis, namely axis Y, extends with a positive direction from bottom to top. Accordingly, a positive edge will be defined between a selected pixel and a pixel on its right if the detected light intensity of the selected pixel is less than the light intensity of the pixel on its right. Conversely, and taking the example of two pixels aligned along axis Y, a negative edge will be defined between the selected pixel and a pixel on its upper side if the light intensity of the selected pixel is greater than the light intensity of the upper pixel. Both compared pixels can be adjacent or non-adjacent.

The optical pointing device further comprises at least one light source 130 such as a LED, which produces radiation, that impinges on a portion of a surface S. Surface S may be a planar or non-planar surface, such as a surface over which the pointing device is moved (as in the case of an optical mouse), the surface of a ball (as in the case of an optical trackball) or any other suitable surface that may provide an appropriate intensity pattern for detection by photodetector array 100. It should be mentioned that a light source is not, strictly speaking, necessary and that ambient light reflected by surface S may directly be used.

Processing means 110 is further adapted to communicate in a bidirectional manner with an interface 140 that communicates in turn with a host system (not illustrated) over a bus 150. Cursor control signals (and eventually other signals related to the optical pointing device) are supplied to the host system over bus 150. Processing means 110 may also receive information, such as configuration signals, over bus 150 from the host system.

Processing means 110 is essentially designed to intermittently sample the pixel outputs of photodetector array 100 in accordance with a defined sequence. The edge information of two successive samples is compared and a relative motion measurement is extracted by processing means 110. The adequate cursor control signals are then derived from the relative motion measurement and transmitted to the host system via line interface 140.

The method for motion detection disclosed in this document is based on two algorithms referred as "Peak/Null Motion Detection" algorithm and as "Local Edge Direction Motion Detection" algorithm. Both algorithms are based on edge direction data from the pixel array and are enclosed herewith by way of reference.

Referring in more detail to the "Peak/Null Motion Detection" algorithm, each row and column of the photodetector array is further analysed to find specific inflection conditions (hereinafter defined as a first inflection condition, or "peak", and a second inflection condition, or "null") in the direction of successive edges along a selected axis (in practice along both X and Y axes). As illustrated in FIG. 2, the first inflection condition, or peak, is defined as the succession, along a determined axis (X or Y), of a positive edge (arrow pointing upwards in FIG. 2) followed by a negative edge (arrow pointing downwards in FIG. 2). Similarly, the second inflection condition, or null, is defined as the succession, along the determined axis, of a negative edge followed by a positive edge.

In contrast to the above edge direction conditions, it will be appreciated that the edge inflection conditions do not appear everywhere. Strictly speaking, one should also consider that there exists a third inflection condition representative of the fact that there does not exist, at a selected location, any inflection in the direction of the edges.

With reference to FIGS. 3, 4a and 4b, one will now describe the basic principle for detecting motion based on the above edge inflection data, referred as the "Peak/Null Motion Detection" algorithm. FIG. 3 schematically shows an exemplary situation (in case of single axis motion detection) of a succession of ten successive edge direction conditions and extracted edge inflection conditions determined from two successive flashes (i.e. conditions derived from two successive light intensity patterns detected by the photodetector array). This exemplary situation is typical of sub-pixel motion (displacement of less than the pixel pitch between two successive flashes). As shown in FIG. 3, three edge inflection conditions are detected, namely a peak between the second and third edge direction conditions, a null between the fourth and fifth edge direction conditions, and a peak between the seventh and eighth edge direction conditions. Following the second flash, one can see that only the null condition moved one unit to the right (this situation again being typical of sub-pixel motion). In addition to accumulators for tracking motion of edge inflection conditions, one additional accumulator per axis is provided for counting the total number of edge inflection conditions (peaks and nulls together) appearing on each axis.

Referring again to the exemplary situation of FIG. 3, one will understand that the accumulator associated to the tracking of motion of edge inflection conditions would be incremented, the total number of peaks and nulls detected by accumulator associated for counting the total number of edge inflection conditions being in this case three. In case of motion detection along two axes (as in the case of an optical pointing device), one will of course have understood that these steps are performed for each row of the array along axis X and each column of the array along axis Y.

This method requires a minimum of two accumulators per axis, one for tracking motion of edge inflection conditions (peaks and nulls being still tracked independently) and another one for tracking the total number of edge inflection conditions detected along the selected axis.

FIGS. 4a and 4b schematically show a variant of the above principle which implements motion detection of edge inflection conditions along the diagonals of the first and second axes (hatched symbols 400 show the six possible neighbouring locations of an edge inflection condition while symbol 410 designates the detected target edge inflection condition). FIGS. 4a and 4b respectively illustrate the principle for edge inflection motion along axis X and Y. This variant can be implemented by incrementing or decrementing the appropriate accumulator, not only if a corresponding edge inflection condition comes from a neighbouring location on the same axis, but also if a corresponding edge inflection conditions comes from one of the four neighbouring locations along the diagonals as depicted in FIGS. 4a and 4b, i.e. along a direction which exhibits a direction component along the axis for which motion is determined. FIGS. 4a and 4b each illustrate the six possible directions (which all exhibit a direction component along the corresponding axis) from which an edge inflection condition could originate when looking at possible displacement along axis X and Y (motion detection along axis Y is actually similar to motion detection along axis X if one rotates 90 degrees the illustration of FIG. 4a).

A calculation method may consist in computing the displacement values along axes X and Y directly, as summarized by the following analytical expressions:

$$X_{DISPLACEMENT} = \frac{(N_{PEAK\text{-}RIGHT} + N_{NULL\text{-}RIGHT}) - (N_{PEAK\text{-}LEFT} + N_{NULL\text{-}LEFT})}{(N_{XPEAK} + N_{XNULL})} \quad (1)$$

$$Y_{DISPLACEMENT} = \frac{(N_{PEAK\text{-}UP} + N_{NULL\text{-}UP}) - (N_{PEAK\text{-}DOWN} + N_{NULL\text{-}DOWN})}{(N_{YPEAK} + N_{YNULL})} \quad (2)$$

$$X_{DISTANCE} = X_{DISPLACEMENT} \cdot L_{PP} \quad (3)$$

$$Y_{DISTANCE} = Y_{DISPLACEMENT} \cdot L_{PP} \quad (4)$$

This method requires a minimum of two accumulators per axis, one for tracking motion of edge inflection conditions (peaks and nulls being still tracked independently) and another one for tracking the total number of edge inflection conditions detected along the selected axis. In order to allow greater flexibility in the calculation, one way use, as a minimum, four accumulators per axis so that either one of the above two calculation method may be implemented with the same motion detection device architecture.

With the development of optical sensing device, all kind of surfaces may be used. However, detection of motion features is disturbed if the supporting surface presents periodic lines oriented in between both detection axes. In particular, users are more and more often using their optical mouse directly on their desk. Then, in case of desks made of wood or other periodic designed materials, these periodic lines interfere with real motion features moving along these lines. In extreme cases, the detected motion can be disturb in such a way that motion along one axis is reported as motion along the other axis.

Furthermore, when using the "Peak/Null Motion Detection" algorithm, even though consideration of diagonals into the calculation method generally improves the motion detection, in the particular case of surface with periodic lines, the reliability of the motion displacement calculated along both axes decreases.

SUMMARY OF THE INVENTION

The object of the present invention is thus to overcome drawbacks of the aforementioned prior art by providing a more reliable detection motion calculation method whichever kind of surface is used to support the optical sensor. For that purpose, according to a first aspect of the present invention, there is provided a method for measuring relative motion between an illuminated portion of a surface and an optical sensing device comprising a photodetector array, which includes a plurality of rows and columns of pixels respectively aligned along first and second axes, the method comprising the steps of:

a) detecting by means of the photodetector array a first light intensity pattern of the illuminated portion of the surface at a first point in time;

b) comparing light intensity between neighbouring pixels of the photodetector array and extracting motion features along each of the first and second axes from the detected first light intensity pattern;

c) storing the extracted motion features;

d) detecting a second light intensity pattern of the illuminated portion of the surface at a second point time;

e) comparing light intensity between neighbouring pixels of the photodetector array and extracting motion features along each of the first and second axes from the detected second light intensity pattern;

f) determining a measurement of the relative motion between the optical sensing device and the illuminated portion of the surface based on a comparison of motion features extracted at steps b) and e);

wherein the method further includes for each motion feature extracted at step e) located in a determined location, the following steps of:

g) checking if a same type of motion feature has been extracted at step b) in at least one of the neighbouring locations located on both sides along the same axis of the determined location including diagonals;

h) checking if a same type of motion feature has not been extracted at step b) along the same axis in the same determined location;

i) checking if a same type of motion feature has been extracted at step b) along the same axis in at least one of the neighbouring locations perpendicular to the determined location with respect to the same axis;

j) discarding when determining motion at step f) each motion feature for which conditions of steps g), h) and i) are fulfilled.

According to different variants of the above detailed method, motion features may be edge direction data, edge inflection data or inflection line data in addition to edge inflection data.

According to another variant, the method further comprises preliminary steps which consist in:
counting the number of diagonals;
comparing said diagonal number with a determined threshold; and
enabling or disabling steps g) to j) if the diagonal number is greater or respectively lower than the determined threshold.

According to a second aspect of the present invention, there is also provided a motion detection device for detecting relative motion with respect to an illuminated portion of a surface, this motion detection device comprising:
a photodetector array including a plurality of pixels aligned along first and second axes for detecting a light intensity pattern of the illuminated portion of the surface;
comparator means coupled to the photodetector array for comparing light intensity between neighbouring pixels of the photodetector array along both the first and second axes and for extracting motion features from the detected light intensity pattern;
storage means for at least temporarily storing the extracted motion features;
processing means for determining a measurement of the relative motion with respect to the illuminated portion of the surface based on a comparison of extracted motion features which are determined from first and second light intensity patterns successively detected by the photodetector array;
wherein the motion detection device further comprises:
means for checking from where in the first light intensity pattern comes each motion feature extracted in the second light intensity pattern; and
means for discarding extracted motion features as a function of the checking results.

According to a preferred embodiment of the above detailed motion detection device, it further comprises
means for counting the number of diagonals
means for comparing said diagonal number with a determined threshold; and
means for enabling or disabling said checking means in function of the comparison result.

DETAILED DESCRIPTION OF THE INVENTION

Figure 1:
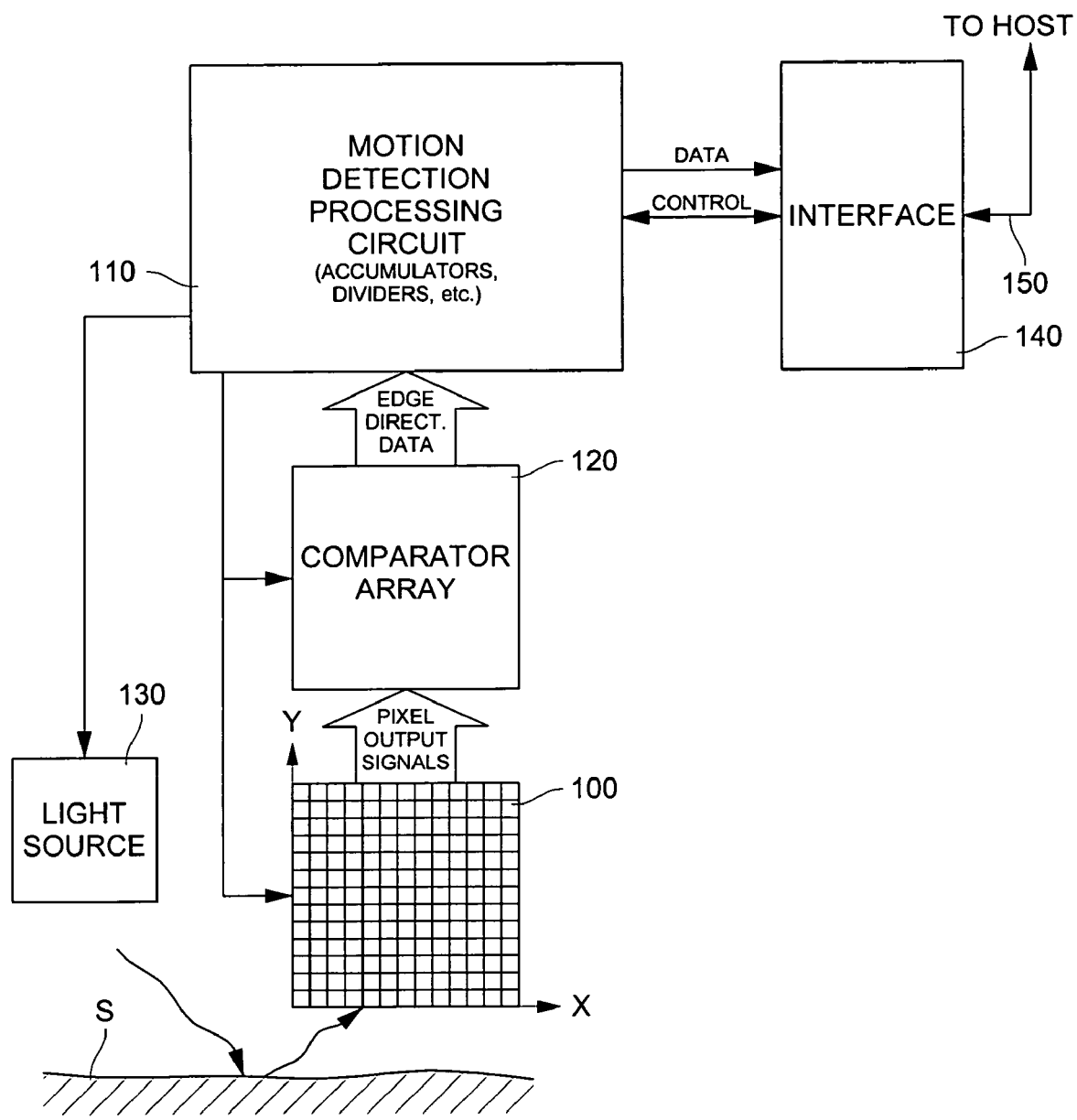
FIG. 1, already described, is a schematic block diagram of an optical pointing device according to the prior art.
Figure 2:
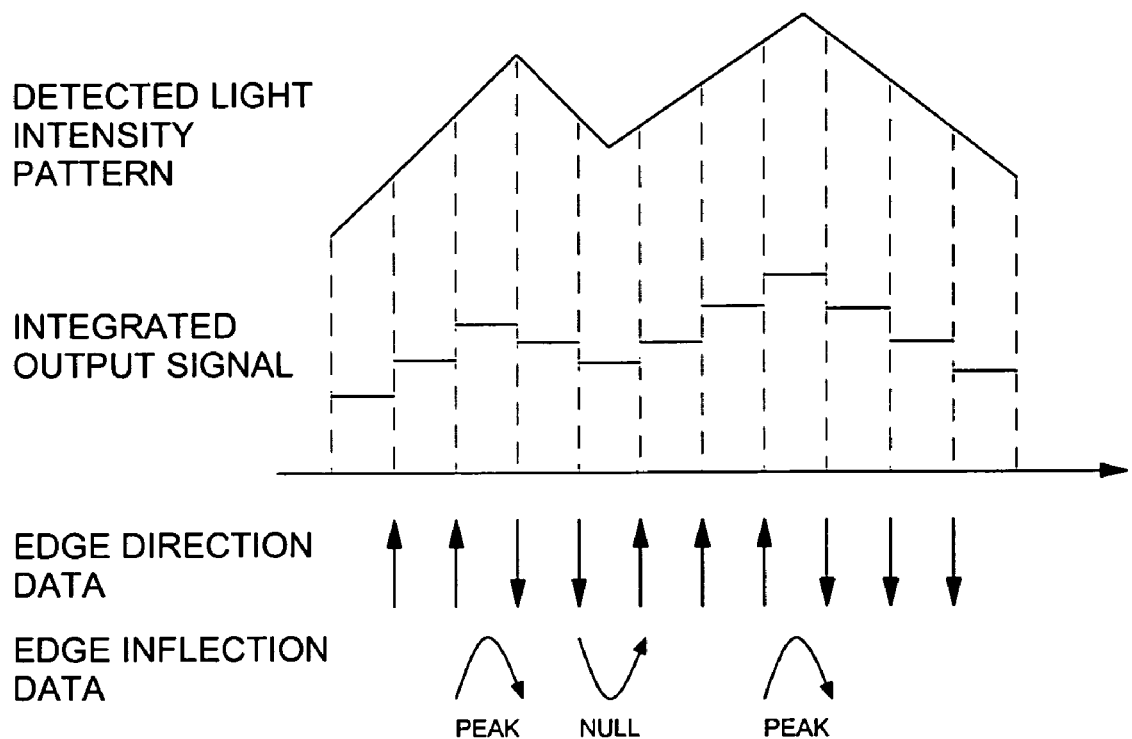
FIG. 2, already described, is a schematic illustration of edge inflection conditions, or peaks and nulls, derived from a sequence of edge direction conditions along a determined axis according to the "Peak/Null motion detection" technique of the prior art.
Figure 3:
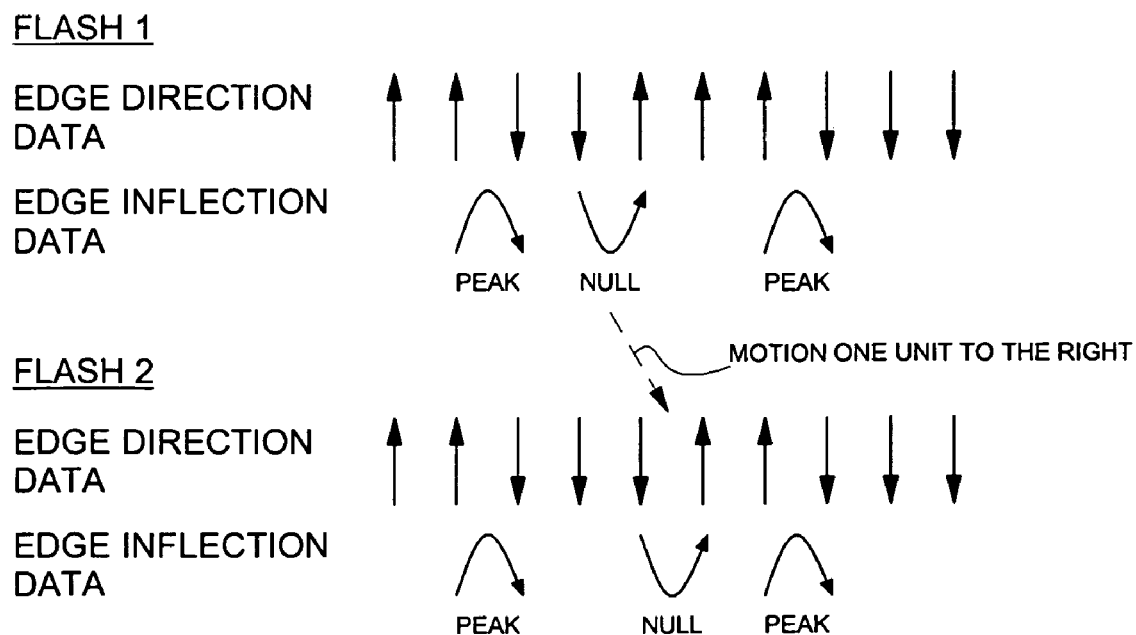
FIG. 3, already described, is a schematic illustration of a motion detection technique which is based on the tracking of peaks and nulls along one axis according to the "Peak/Null motion detection" technique of the prior art.
Figure 4A:
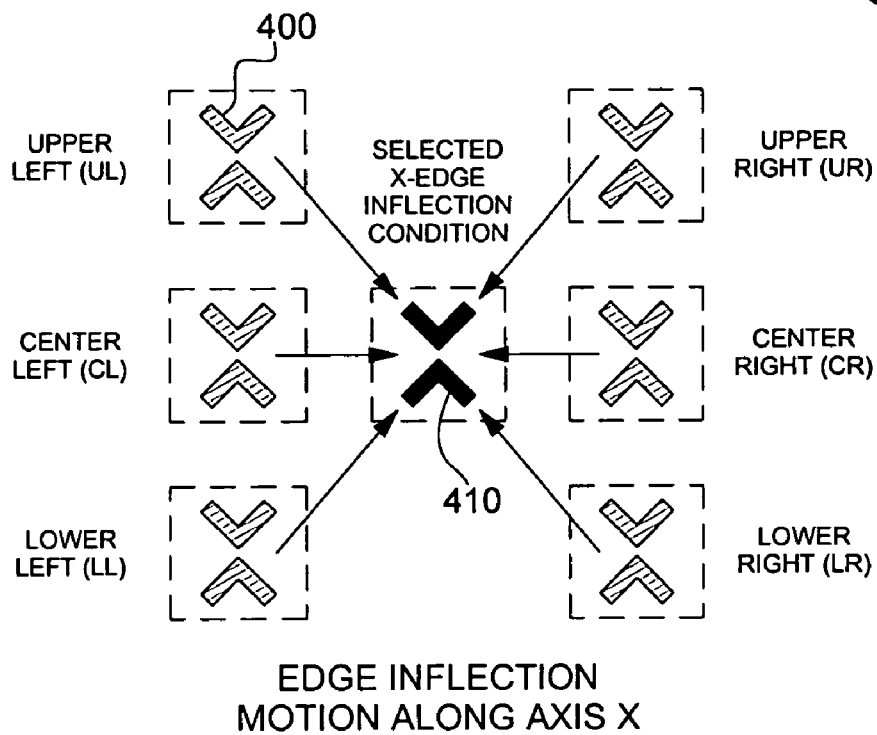
FIGS. 4a and 4b, already described, are schematic illustrations of a motion detection technique for motion detection along first and second axes and which implements tracking of the peaks and nulls along diagonals of the first and second axes.
Figure 4B:
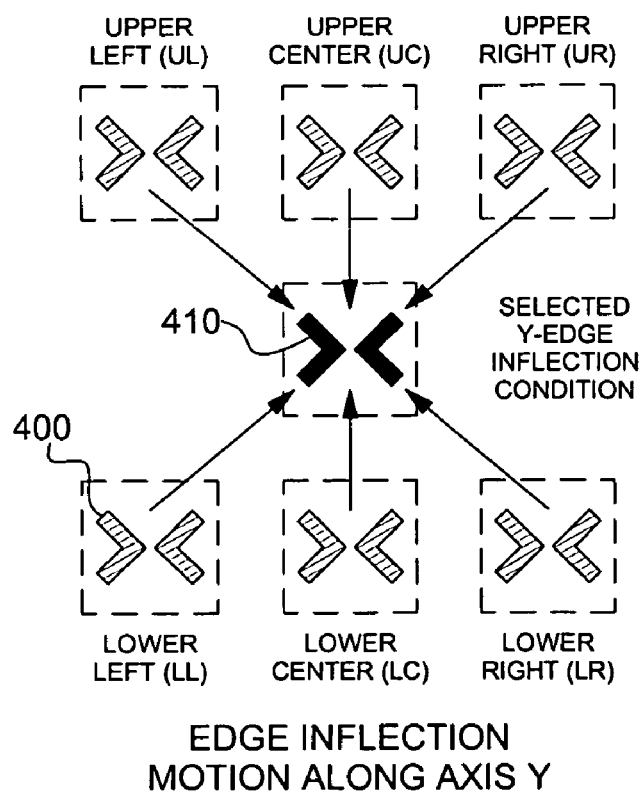

In the following description, the motion detection method will be described in an illustrative and non-limiting manner in relation with an optical pointing device as illustrated in FIG. 1. However, it will be appreciated that any other suitable optical pointing device may be used in order to implement the method according to the invention. Furthermore, the following motion detection method is based on the so-called "Peak/Null motion detection" algorithm described in the International Patent Application No WO 03/049018, and will be called "Angle Error Correction" algorithm herein under. Nevertheless, it will also be appreciated that it could be based on the so-called "Local Edge Direction Motion Detection" algorithm (see WO 03/049018), the so-called "Line Feature" algorithm (see U.S. patent application Ser. No. 11/020,018) or any other suitable motion detection method.

Figure 5A:
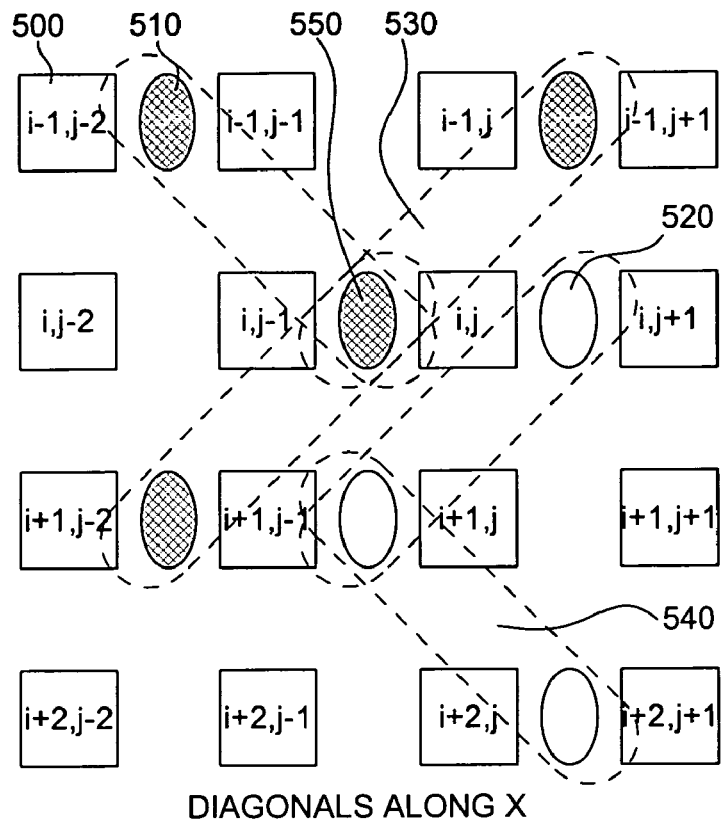
FIGS. 5a and 5b are schematic illustrations of diagonals along the first and second axes of motion detection.
Figure 5B:
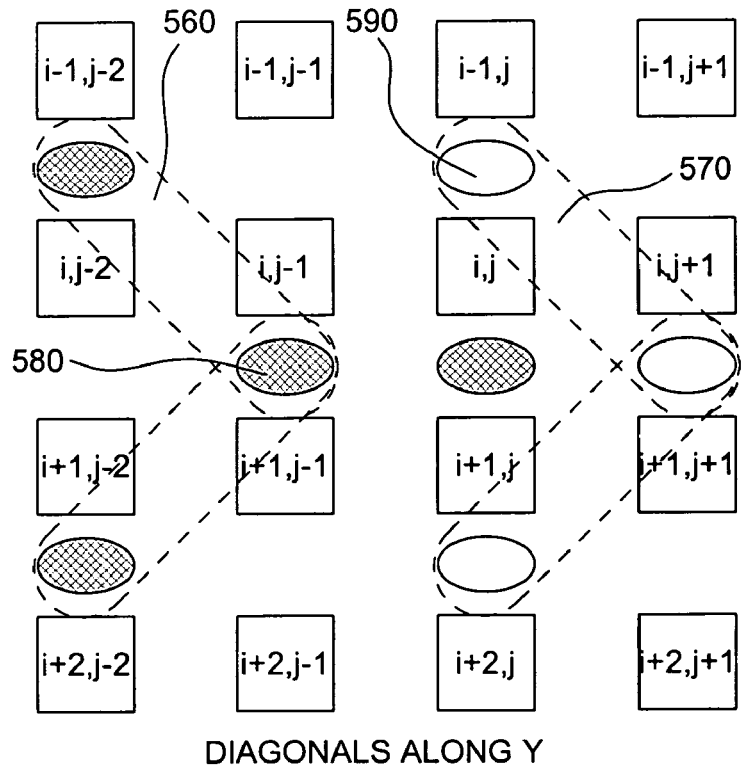

With reference to FIGS. 5a and 5b, one will now describe what is considered in the following specification as diagonals. FIGS. 5a and 5b represent motion features detected respectively along X-axis and Y-axis considering a portion of the photodetector array of the optical pointing device. Squares 500 represent pixels of the photodetector array. Between pixels, ovoid shapes 510, 520 represent detected motion features relative to the neighbouring pixels. It is to be noted that these motion features can be edge direction data, which data is descriptive of light intensity differences between the neighbouring pixels, as well as inflection direction data, which is descriptive of the succession of positive and negative edges, or any other suitable motion feature data.

As described in relation with the prior art, motion feature data may be divided in two different types. For instance, if considering edge direction data, then there are positive and negative edges and if considering edge inflection data, then there are peaks and nulls. These two different types of motion features are distinguished by hatched 510 and non-hatched 520 ovoid shapes. For instance, the hatched ones represent positive edges, since motion features correspond to edge direction data, or peaks, since motion features correspond to edge inflection data. And the non-hatched ones represent negative edges, since motion features correspond to edge direction data, or nulls, since motion features correspond to edge inflection data. For sake of simplicity, in the following description, motion features will be referred only as edge inflection data, without prejudice of other suitable kind of motion feature data.

Considering FIG. 5a, it represents motion features detected along X-axis. An X-diagonal is a combination of two neighbouring X-inflections of the same type, namely two X-peaks or two X-nulls, which are located along a 45 degree line. It will be appreciated that this 45 degree angle is to be interpreted as a non limiting example wherein both axes X and Y of the photodetector array are orthogonally arranged. On the represented example of FIG. 5a, one can see three diagonals of peaks 530 and two diagonals of nulls 540. If one considers one target location, for example location 550 on FIG. 5a, there are four possible neighbouring locations situated along a 45 degree line, which may form in association with target location 550 an X-diagonal since an inflection of the same type is detected along X-axis in one of these locations.

Considering now FIG. 5b, in the same manner as for FIG. 5a, it represents motion features detected along Y-axis. A Y-diagonal is a combination of two neighbouring Y-inflections of the same type, namely two Y-peaks or two Y-nulls, which are located along a 45 degree line. On the represented example of FIG. 5b, one can see two diagonals of peaks 560 and two diagonals of nulls 570. If one considers one target location, for instance location 580 on FIG. 5b, there are four possible neighbouring locations situated along a 45 degree line, which may form in association with target location 580 a Y-diagonal since an inflection of the same type is detected along Y-axis in one of these locations.

As explained before in relation with problems encountered in the prior art, the "Angle Error Correction" algorithm should be used preferably only when the support surface of the optical pointing device presents periodic lines at more or less 45° with respect to the detection axes. Within the scope of the present invention, it has been shown that there is a relation between these periodic lines on the surface and the number of detected diagonals. For that purpose, an advantageous method consists of counting the total number of detected diagonals and comparing this total number with a determinated threshold above which the "Angle Error Correction" algorithm is automatically enabled.

Alternatively, the "Angle Error Correction" could be enabled/disabled by using a button provided with the optical pointing device, or even it may be provided an optical pointing device where the algorithm is always enabled.

In order to detect X-diagonals without redundancy, for each target location where an X-inflection has been detected, the processing means of the optical pointing device is programmed to check if at the location above it to the right or the location below it to the right, an X-inflection of the same type has been also detected. If none of these two locations present such an inflection, then zero diagonals is detected for this location. If both locations present inflections of the same type as the inflection of the target location, two diagonals are detected. Thus for each location, the algorithm may detect from zero to two diagonals. It is understood that the location considered must present one inflection; otherwise no diagonals will be detected for this location.

Referring back again FIG. 5a, if we consider pixel (i, j) (row i, column j), to whom X-peak in location 550 is related, one diagonal will be detected since another X-peak is detected in relation with pixel (i−1, j+1) in the location above to the right of location 550. In the same manner, two other X-peak diagonals are detected in relation with pixels (i+1, j−1; i, j) and pixels (i−1, j−1; i, j). Two X-null diagonals are also detected in relation with pixels (i+1, j; i, j+1) and pixels (i+1, j; i+2, j+1).

The detection of Y-diagonals is done in the same way as the detection of X-diagonals. For each location that presents a Y-inflection, the processing means are programmed to check if the location above it to the right or the location below it to the right, present the same type of Y-inflection. Thus, as for X-axis, for each location, zero to two Y-diagonals may be detected. Of course, if a location does not present any Y-inflection, then no diagonals is detected.

Referring back again to FIG. 5b, if we consider pixel (i, j) to whom Y-null in location 590 is related, one diagonal will be detected since another Y-null is detected in relation with pixel (i+1, j+1) in the location below to the right of location 590. In the same manner, one other Y-null diagonal is detected in relation with pixels (i+2, j; i+1, j+1). Two Y-peaks diagonals are also detected in relation with pixels (i+2, j−2; i+1, j−1) and pixels (i, j−2; i+1, j−1). If we consider the Y-peak detected in relation with pixel (i+1, j−1), there are two inflections detected above to the right and below to the right, however these inflections are Y-null, i.e. the other inflection type, and therefore do not constitute diagonals.

One will now describe the "Angle Error Correction" algorithm according to a preferred embodiment of the invention based on the "Peak/Null motion detection" algorithm, which may furthermore takes advantageously into account the so-called line features which are detailed in the U.S. patent application Ser. No. 11/020,108 filed in the name of the same Assignee and which is incorporated herein by way of reference. For sake of clarity, we will give a short definition of the two types of inflection lines. Inflection line data is descriptive of the succession of two adjacent edge inflections of the same type transversally detected along each of both axes and including a first line condition, or line of peaks, defined as the succession, transversally to one axis, of two adjacent peaks, and a second line condition, or line of nulls, defined as the succession, transversally to one axis, of two adjacent nulls.

Figure 6A:
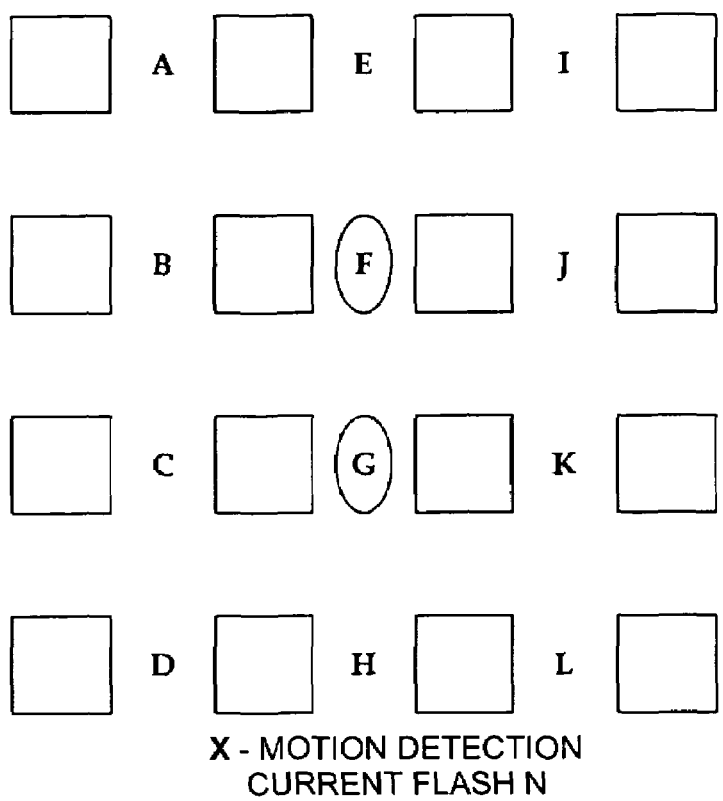
FIGS. 6a and 6b are schematic illustrations of a motion detection method for motion detection between two flashes along a first axis and which implements the angle error correction algorithm.
Figure 6B:
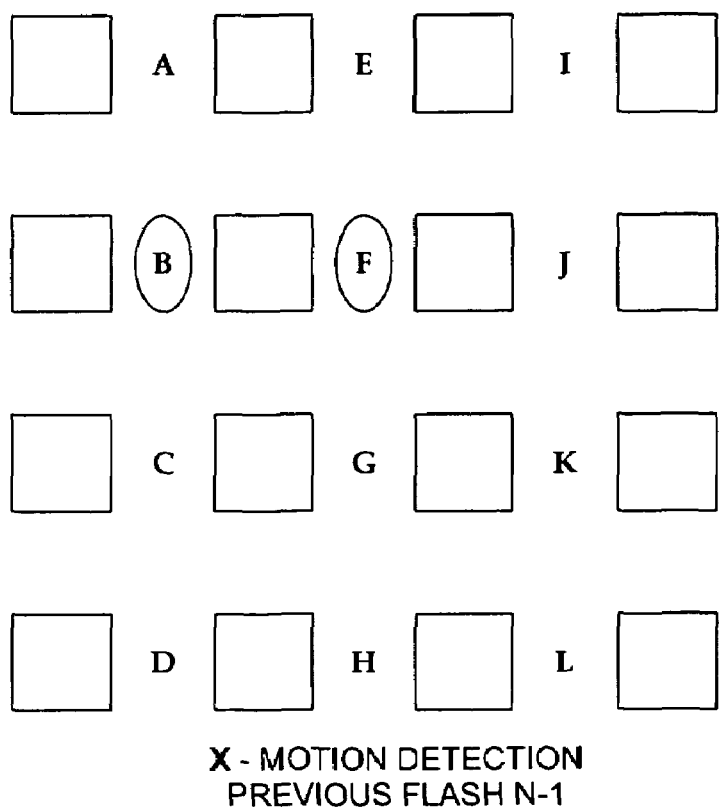

FIGS. 6a and 6b represent X-motion detection along X-axis respectively at a current flash N and at the previous flash N−1 for a portion of the photodetector array of the optical pointing device. If one considers central or target locations F and G of a portion of the photodetector array of the optical pointing device, for each target location F, respectively, G, they are eight neighbouring locations, which are the upper left side location A, respectively B, the left side location B, respectively C, the lower left side location C respectively D, the upper right side location I, respectively J, the right side location J, respectively K, the lower down side location K, respectively L, the upper central location E, respectively F and the lower central location G, respectively H. Each of these twelve locations from A to L may contain a motion feature data, for instance edge inflection condition, resulting from the comparison between the different detected light intensities of pixels as detailed in the International Patent Application WO 03/049018.

In the represented example on FIG. 6a, corresponding to a current flash N, X-nulls are detected in locations F and G and no motion feature is detected in the other locations A to E and H to L. On FIG. 6b, corresponding to a previous flash N−1, X-nulls are detected in locations B and F, and no motion feature is detected in any other locations namely A, C to E, and G to L.

According to the traditional method for detecting motion, and considering for instance F as target location, the algorithm checks if an X-inflection (Peak/Null) of the same type as the target location existed in locations A, B or C in the previous flash. If yes, a right motion accumulator counting the number of this inflection type (Peak/Null) moving to the right is incremented for each detected X-inflections of the same type in locations A, B or C, or incremented only once since at least one X-inflections of the same type is detected in any of locations A, B, or C. If an X-inflection of the same type as the target location is detected in any of locations 1, J or K in the previous flash, then a left motion accumulator is incremented for each detected X-inflections of the same type in locations I, J or K, or incremented only once since at least one X-inflections of the same type is detected in any of locations I, J, or K. The displacement along X is then calculated as follows $$X_{DISPLACEMENT} = \frac{(N_{PEAK\text{-}RIGHT} + N_{NULL\text{-}RIGHT}) - (N_{PEAK\text{-}LEFT} + N_{NULL\text{-}LEFT})}{(N_{XPEAK} + N_{XNULL})} \quad (1)$$

According to the motion detection method of the present invention implementing the "Angle Error Correction" algorithm, it further includes a checking process between two light intensity patterns for discarding erroneous motion features due to the surface. This checking process comprises the following steps:

checking if a same type of motion feature, for instance the same inflection type, has been extracted during the previous flash in at least one of the neighbouring locations located on both sides along the X-axis of the central or target location including diagonals, i.e. along a direction which exhibits a direction component along X-axis for which motion is determined;

checking if a same type of motion feature, for instance the same inflection type, has not been extracted during the previous flash along X-axis in the same central or target location;

checking if a same type of motion feature, for instance the same inflection type, has been extracted during the previous flash along the X-axis in at least one of the neighbouring locations perpendicular to said determined location with respect to X-axis;

In the case that all three conditions are fulfilled, then it is provided with that the detected motion feature of the target location is discarded which means that the corresponding motion accumulator is not incremented or decremented. Since motion features correspond to inflections, it is further provided that the detected inflection in the target location should not be counted as an inflection when calculating the total number of inflection detected along one axis.

Referring once again to FIGS. 6a and 6b, in the current flash N (FIG. 6a), X-nulls have been extracted in target positions F and G. Therefore, the checking process shall check if the three conditions detailed above are fulfilled or not.

Considering target location F, the first condition is fulfilled since one X-null has been detected in the left side location B in the previous flash N−1 (FIG. 6b), however neither the second condition nor the third condition is fulfilled since an X-null has been detected in target location F in the previous flash N−1 and no X-null has been detected in any of the neighbouring locations E or G perpendicular to target location F. Therefore, the detected inflection in target location F is not discarded.

Considering now target location G, all three conditions are fulfilled since an X-null has been detected in neighbouring location B, namely the upper left side location, in the previous flash N−1 (first condition), no X-null has been detected in target location G in the previous flash (second condition), and an X-null has been detected in neighbouring location F perpendicular to target location G with respect to X-axis in the previous flash (third condition). Therefore the detected X-null in target location G will be discarded, which means that the right/left motion accumulators will not be incremented, and furthermore will not be counted as an X-inflection, which means that the total number of X-inflections detected along X-axis does not take into account these specific discarded X-inflections.

According to a preferred variant, the "Angle Correction Error" algorithm is based on the "Line Feature" algorithm disclosed in the U.S. patent application Ser. No. 11/020,108 enclosed herein by way of reference. Displacement along X-axis is given by the following formula:

$$X_{DISPLACEMENT} = \frac{(N_{PEAK\text{-}RIGHT} + N_{NULL\text{-}RIGHT}) - (N_{PEAK\text{-}LEFT} + N_{NULL\text{-}LEFT})}{F(N_{X\text{-}INFLECTION}, N_{XLINE\text{-}PREV})} \quad (5)$$

For all motion features which fulfil the three conditions, the algorithm will further discard inflection line data related to the target location. Inflection line data is descriptive of the succession of two adjacent edge inflections of the same type detected perpendicularly to the motion detection axis, for instance X-axis. In the represented example of FIG. 6a, one X-line of nulls has been detected formed by both X-nulls located in F and G locations. Therefore, this X-line should be discarded when calculating the displacement along X-axis. In order to avoid redundancy, only one inflection line is related to a target location, for example this line may comprise the target location and the location located above the target one, namely the central upper location.

Figure 7A:
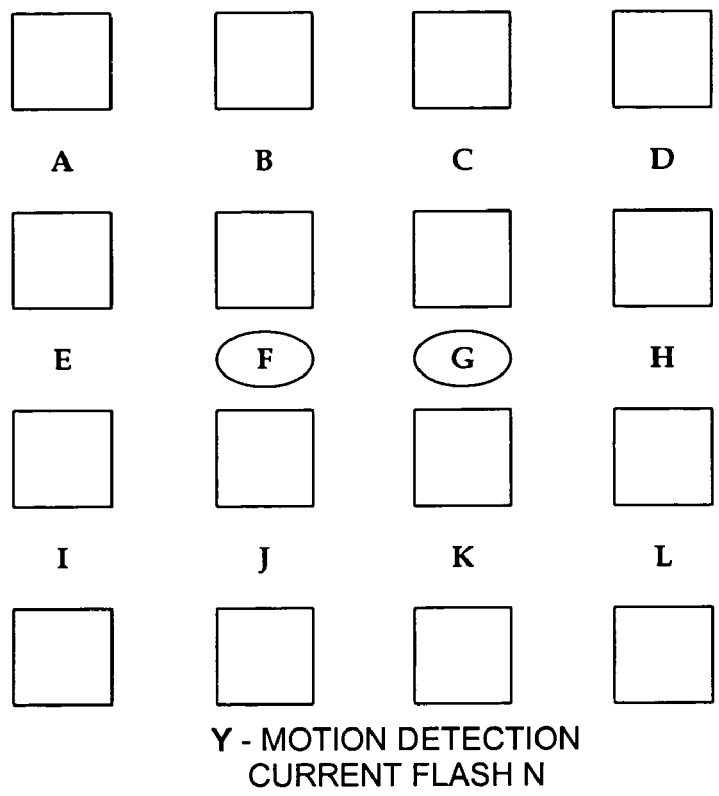
FIGS. 7a and 7b are schematic illustrations of a motion detection method for motion detection between two flashes along a second axis and which implements the angle error correction algorithm.
Figure 7B:
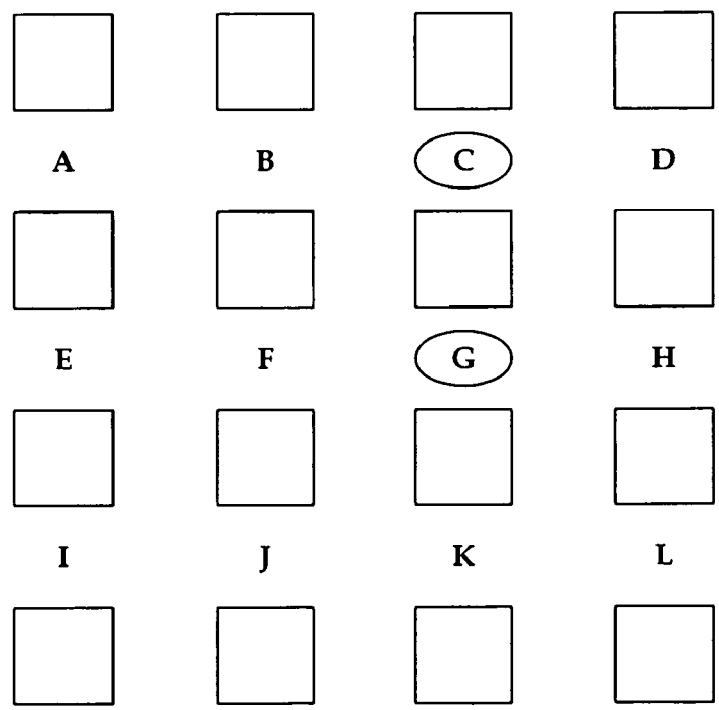

FIGS. 7a and 7b represent Y-motion detection along Y-axis respectively at a current flash N and at the previous flash N−1 for a portion of the photodetector array of the optical pointing device. In the same manner as for X-motion detection, if one considers central or target locations F and G, for each they are eight neighbouring locations. Each one of the twelve locations from A to L may contain a motion feature data, for instance edge inflection data, resulting from the comparison between the different detected light intensities of pixels.

In the represented example on FIG. 7a, corresponding to a current flash N, Y-nulls are detected in locations F and G and no motion feature is detected in the other locations A to E and H to L. On FIG. 7b, corresponding to a previous flash N−1, Y-nulls are detected in locations C and G, and no motion feature is detected in any other locations namely A, B, D to F and H to L.

According to the traditional method for detecting motion, and considering for instance F as target location, the algorithm checks if an Y-inflection (Peak/Null) of the same type as the target location existed in locations A, B or C in the previous flash. If yes, a down motion accumulator counting the number of this inflection type (Peak/Null) moving down is incremented for each detected Y-inflections of the same type in locations A, B or C, or incremented only once since at least one Y-inflections of the same type is detected in any of locations A, B, or C. If an Y-inflection of the same type as the target location is detected in any of locations I, J or K in the previous flash, then an up motion accumulator is incremented for each detected Y-inflections of the same type in locations I, J or K, or incremented only once since at least one Y-inflections of the same type is detected in any of locations I, J, or K. The displacement along X is then calculated as follows:

$$Y_{DISPLACEMENT} = \frac{(N_{PEAK\text{-}UP} + N_{NULL\text{-}UP}) - (N_{PEAK\text{-}DOWN} + N_{NULL\text{-}DOWN})}{(N_{YPEAK} + N_{YNULL})} \quad (2)$$

According to the motion detection method of the present invention implementing the "Angle Error Correction" algorithm, it further includes a checking process between two light intensity patterns for discarding erroneous motion features due to the surface. This checking process comprises the following steps:

checking if a same type of motion feature, for instance the same inflection type, has been extracted during the previous flash in at least one of the neighbouring locations located on both sides along the Y-axis of the central or target location including diagonals, i.e. along a direction which exhibits a direction component along Y-axis for which motion is determined;

checking if a same type of motion feature, for instance the same inflection type, has not been extracted during the previous flash along Y-axis in the same central or target location;

checking if a same type of motion feature, for instance the same inflection type, has been extracted during the previous flash along the Y-axis in at least one of the neighbouring locations perpendicular to said determined location with respect to Y-axis;

In the case that all three conditions are fulfilled, then it is provided with that the detected motion feature of the target location is discarded which means that the corresponding motion accumulator is not incremented or decremented. Since motion features correspond to inflections, it is further provided that the detected inflection in the target location should not be counted as an inflection when calculating the total number of inflection detected along one axis.

Referring once again to FIGS. 7a and 7b, in the current flash N (FIG. 7a), Y-nulls have been extracted in target positions F and G. Therefore, the checking process shall check if the three conditions detailed above are fulfilled or not.

Considering target location F, the three conditions are fulfilled since one Y-null has been detected in the upper left side location C in the previous flash N−1 (first condition), an Y-null has not been detected in target location F in the previous flash N−1 (condition 2) and an Y-null has been detected in location G perpendicular to target location F with respect to Y-axis. Therefore the detected Y-null in target location F will be discarded, which means that the up/down motion accumulators will not be incremented, and furthermore will not be counted as an Y-inflection, which means that the total number of Y-inflections detected along Y-axis does not take into account these specific discarded Y-inflections.

Considering now target location G, only the first condition is fulfilled since an X-null has been detected in neighbouring location C, namely the upper central location, in the previous flash N−1, however neither the second condition nor the third condition has been fulfilled since an Y-null has been detected in target location G in the previous flash, and an Y-null has not been detected in one of the neighbouring locations F or H perpendicular to target location G with respect to Y-axis in the previous flash. Therefore, the detected Y-inflection in target location G is not discarded.

According to a preferred variant, the "Angle Correction Error" algorithm is based on the "Line Feature" algorithm. Displacement along Y-axis is given by the following formula:

$$Y_{DISPLACEMENT} = \frac{(N_{PEAK\text{-}UP} + N_{NULL\text{-}UP}) - (N_{PEAK\text{-}DOWN} + N_{NULL\text{-}DOWN})}{F(N_{Y\text{-}INFLECTION}, N_{YLINE\text{-}PREV})} \quad (6)$$

For all motion features which fulfil the three conditions, the algorithm will further discard inflection line data related to the target location. Inflection line data is descriptive of the succession of two adjacent edge inflections of the same type detected perpendicularly to the motion detection axis, for instance Y-axis. In the represented example of FIG. 7a, one Y-line of nulls has been detected formed by both Y-nulls located in F and G locations. Therefore, this Y-line should be discarded when calculating the displacement along Y-axis. In order to avoid redundancy, only one inflection line is related to a target location, for example this line may comprise the target location and the location located on the right side of the target one.

Having described the invention with regard to certain specific embodiments, it is to be understood that these embodiments are not meant as limitations of the invention. Indeed, various modifications and/or adaptations may become apparent to those skilled in the art without departing from the scope of the annexed claims. For instance, the proposed embodiments are not necessarily limited to sensing devices comprising a regular array of pixels aligned along two orthogonal axes. Other pixel arrangements may be envisaged, such as pixel arrangements including pixels aligned along two (or more) non orthogonal axes.

Finally, it will again be appreciated that each comparator input may be connected to more than one photosensitive element. For instance, the output signals of several adjacent or even non-adjacent pixels may be summed so as to create a "filtered" pixel as schematically illustrated in FIG. 13 of U.S. patent application Ser. No. 10/001,963.

What is claimed is:

1. A method for measuring relative motion between an illuminated portion of a surface (S) and an optical sensing device comprising a photodetector array (420), which includes a plurality of rows and columns of pixels respectively aligned along first and second axes (X, Y), said method comprising the steps of:
   a) detecting by means of said photodetector array a first light intensity pattern of said illuminated portion of the surface at a first point in time;
   b) comparing light intensity between neighbouring pixels of said photodetector array and extracting motion features along each of said first and second axes from said detected first light intensity pattern;
   c) storing said extracted motion features;
   d) detecting a second light intensity pattern of said illuminated portion of the surface at a second point in time;
   e) comparing light intensity between neighbouring pixels of said photodetector array and extracting motion features along each of said first and second axes from said detected second light intensity pattern;
   f) determining a measurement of the relative motion between said optical sensing device and said illuminated portion of the surface based on a comparison of motion features extracted at steps b) and e);

wherein said method further includes for each motion feature extracted at step e) located in a determined location, the following steps of:

g) checking if a same type of motion feature has been extracted at step b) in at least one of the neighbouring locations located on both sides along the same axis of said determined location including diagonals;

h) checking if a same type of motion feature has not been extracted at step b) along the same axis in the same determined location;

i) checking if a same type of motion feature has been extracted at step b) along the same axis in at least one of the neighbouring locations perpendicular to said determined location with respect to said axis; and j) discarding when determining motion at step f) each motion feature for which conditions of steps g), h) and i) are fulfilled, said method further comprising the preliminary steps of:
counting the number of diagonals;
comparing said diagonal number with a determined threshold; and
enabling or disabling steps g) to j) if the diagonal number is greater or respectively lower than the determined threshold.

2. A motion detection device for detecting relative motion with respect to an illuminated portion of a surface, this motion detection device comprising:

a photodetector array including a plurality of pixel aligned along first and second axes for detecting a light intensity pattern of the illuminated portion of the surface;

comparator means coupled to the photodetector array for comparing light intensity between neighbouring pixels of the photodetector array along both the first and second axes and for extracting motion features from the detected light intensity pattern;

storage means for at least temporarily storing the extracted motion features;

processing means for determining a measurement of the relative motion with respect to the illuminated portion of the surface based on a comparison of extracted motion features which are determined from first and second light intensity patterns successively detected by the photodetector array;

wherein the motion detection device further comprises:

means for checking from where, in the first light intensity pattern, comes each motion feature extracted in the second light intensity pattern;

means for discarding extracted motion features as a function of the checking results; and means for enabling/disabling said checking means, wherein said means for enabling/disabling comprises:

means for counting the number of diagonals;

means for comparing said diagonal number with a determined threshold; and means for enabling or disabling said checking means as a function of the comparison result.

3. A method for measuring relative motion between an illuminated portion of a surface (S) and an optical sensing device comprising a photodetector array (420), which includes a plurality of rows and columns of pixels respectively aligned along first and second axes (X, Y), said method comprising the steps of:

a) detecting by means of said photodetector array a first light intensity pattern of said illuminated portion of the surface at a first point in time;

b) comparing light intensity between neighbouring pixels of said photodetector array and extracting motion features along each of said first and second axes from said detected first light intensity pattern;

c) storing said extracted motion features;

d) detecting a second light intensity pattern of said illuminated portion of the surface at a second point in time;

e) comparing light intensity between neighbouring pixels of said photodetector array and extracting motion features along each of said first and second axes from said detected second light intensity pattern;

f) determining a measurement of the relative motion between said optical sensing device and said illuminated portion of the surface based on a comparison of motion features extracted at steps b) and e);

wherein said method further includes for each motion feature extracted at step e) located in a determined location, the following steps of:

checking from where, in the first light intensity pattern, comes each motion feature extracted in the second light intensity pattern; and discarding extracted motion features as a function of the checking results, wherein said method comprises the preliminary steps of:
counting a number of diagonals;
comparing said diagonal number with a determined threshold; and
enabling or disabling said checking means as a function of the comparison result.

* * * * *